United States Patent [19]

Tsubuko et al.

[11] 3,997,488
[45] Dec. 14, 1976

[54] PROCESS FOR THE PREPARATION OF A NON-AQUEOUS DISPERSION OF THERMOPLASTIC RESIN

[75] Inventors: Kazuo Tsubuko; Eiichi Kawamura, both of Tokyo, Japan

[73] Assignee: Ricoh Co., Ltd., Tokyo, Japan

[22] Filed: Aug. 5, 1975

[21] Appl. No.: 602,103

[30] Foreign Application Priority Data

Aug. 8, 1974 Japan .................. 49-90984

[52] U.S. Cl. .............. 260/28.5 A; 260/28.5 R
[51] Int. Cl.$^2$ ...................... C08L 91/00
[58] Field of Search ............ 260/28.5 R, 28.5 A, 260/889, 897 B, 885

[56] References Cited

UNITED STATES PATENTS 3,665,053  5/1972  Mizutani et al. .......... 260/897 B X

*Primary Examiner*—Lewis T. Jacobs
*Attorney, Agent, or Firm*—Woodhams, Blanchard and Flynn

[57] ABSTRACT

This invention provides non-aqueous dispersions containing a graft-copolymer and at least one substance selected from the group consisting of wax and polyethylene in an organic solvent having a high resistivity and a low dielectric constant, said dispersions being useful for coatings, especially binders for use in electrostatic coating and toners for use in electrophotography.

12 Claims, No Drawings

PROCESS FOR THE PREPARATION OF A NON-AQUEOUS DISPERSION OF THERMOPLASTIC RESIN

BACKGROUND OF THE INVENTION

It is well known to provide non-aqueous dispersions containing a graft-copolymer in a liquid carrier having a high resistivity and a low dielectric constant such as an aliphatic hydrocarbon. We found that the dispersability and the stability of the non-aqueous dispersions as above can be improved by adding wax having a softening point of 60° C to 130° C or polyethylene to the non-aqueous dispersion. The present invention is based on this finding.

It is an object of the present invention to provide a non-aqueous dispersion containing a graft-copolymer, having high dispersability and stability.

SUMMARY OF THE INVENTION

The present invention relates to a non-aqueous dispersion containing a graft-copolymer and polyethylene or wax in an organic solvent having a high resistivity and a low dielectric constant and a process of preparing said non-aqueous dispersion.

The non-aqueous dispersion of the present invention is prepared by carrying out successively the following four steps (a), (b), (c) and (d) in an organic solvent such as an aliphatic hydrocarbon or a halogenated aliphatic hydrocarbon at an elevated temperature, adding wax having a softening point of 60° C to 130° C or polyethylene in one of the four steps and then cooling the reaction product while stirring vigorously: (a) copolymerizing a monomer having the general formula (I):

$$CH_2=\overset{R}{\underset{A}{C}}$$ (I)

,wherein R is hydrogen or methyl, A is $-COOC_nH_{2n+1}$ or $-OC_nH_{2n+1}$, and n is an integer of 6 to 20, with at least one compound selected from the group consisting of unsaturated carboxylic acid, glycidyl acrylate and glycidyl methacrylate, b. esterifying the copolymer obtained in the above step (a) with glycidyl acrylate or glycidyl methacrylate when said copolymer has been prepared by using an unsaturated carboxylic acid or esterifying the copolymer obtained in the above step (a) with an unsaturated carboxylic acid, when said copolymer has been prepared by using glycidyl acrylate or glycidyl methacrylate, c. grafting the esterified copolymer obtained in the above step (b) with a monomer having a vinyl group, and then d. polymerizing the graftpolymer obtained in the above step (c) with at least one polar-compound selected from the group consisting of vinyl monomer having the formula (II), maleic acid furmaric acid, allylamine, vinylamine, aroylalcohol, vinyl sulfonic acid and vinyl phosphate $$CH_2=\overset{R}{\underset{B}{C}}$$ (II)

wherein R is hydrogen or methyl, B is

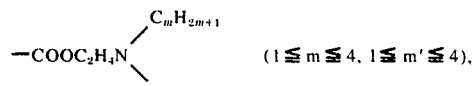

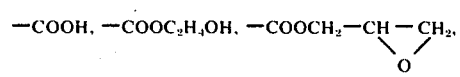

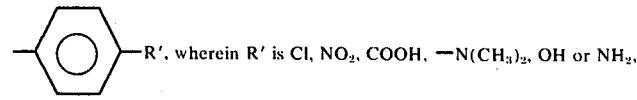

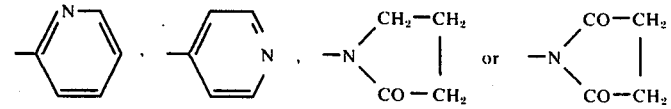

The process of preparing a non-aqueous dispersion of this invention will be described in detail below:

The reaction of the step (a) is carried out by heating a mixture of a monomer of the formula (I) and one compound selected from the group consisting of unsaturated carboxylic acid, glycidyl acrylate and glycidyl methacrylate in a ratio of 99.9–80 to 0.1–20 parts by weight at a temperature of 70° C to 150° C in an aliphatic hydrocarbon. Typical monomers of the formula (I) include lauryl, 2-ethylhexyl, stearyl or acrylates or methacrylates, and the unsaturated carboxylic acids, copolymerizing with the monomer having the formula (I), include acrylic acid, methacrylic acid, fumaric acid, crotonic acid, itaconic acid, maleic acid, etc.

The reaction of the step (b) is carried out by adding a monomer as mentioned above to the reaction mixture obtained in the step (a) and heating the mixture at a temperature of 30° C to 120° C in the presence of a catalyst such as pyridine or lauryldimethylamine. Said monomer is used in an amount of 0.1–20 parts based on 100 parts by weight of the copolymer obtained in the step (a).

The reaction of the step (c) is carried out by adding a monomer as mentioned above to the reaction mixture obtained in the step (b) and heating the mixture at a temperaure of 70° C to 150° C in the presence of a catalyst such as benzoyl peroxide or 2,2'-azobisisobutyronitrile. Said monomer is used in an amount of 5–100 parts based on 100 parts by weight of the esterified copolymer obtained in the step (b). Typical monomers having a vinyl group include acrylic acid, methacrylic acid, a lower alkyl ester of acrylic acid, methacrylic acid, styrene, methylstyrene and vinyl acetate. The lower alkyl ester of acrylic acid or methacrylic acid used in this step (c) is methyl, ethyl, propyl or butyl acrylate or methacrylate.

Next, the step (d) is carried out by adding 0.1 to 20 parts by weight of a polar compound to 100 parts by weight of a graft copolymer obtained by the step (c) and effecting reaction within the reaction mixture of (d) by heating at a temperature in the range of from 70° to 150° C. Through this reaction, the polar compound is polymerized and bonded to the graft portion of the graft-copolymer of (c) to form a polar group.

In the present invention, reaction is effected upon adding wax having a softening point in the range of from 60° to 130° C or polyethylene in any one of the afore-mentioned steps — preferably in the step (c) — and completely dissolving the mixture in a non-aqueous solvent. To cite the applicable non-aqueous solvent, there are n-hexane, n-pentane, isoctane, commercial aliphatic hydrocarbons like Isopar H, G, L and K or halogen derivatives thereof such as carbon tetrachloride and perchloroethylene. These non-aqueous solvents are supposed to be heated at the time of effecting the reaction, but if the temperature for heating is below the softening point of wax or polyethylene, said mixture will fail to be dissolved. In this case, it is necessary to heat the solvent further to raise the temperature above said softening point. Further, the appropriate amount of wax or polyethylene to be applied is in the range of from 5 to 50 parts by weight relative to 100 parts by weight of the mixture of monomer I and unsaturated carboxylic acid or glycidyl acrylate and/or glycidyl methacrylate in the step (a), from 5 to 50 parts by weight relative to 100 parts by weight of the copolymer in the step (b), from 1 to 40 parts by weight relative to 100 parts by weight of the esterified copolymer in the step (c), and from 5 to 50 parts by weight relative to 100 parts by weight of the graft-copolymer in the step (d). In this connection, whichever step it may be applied to, wax or polyethylene per se will not participate in the reaction and not have any substantial influence upon the quality of the non-aqueous thermoplastic resin as the final product, but it is preferable to apply it to the step (c) from the view point of enhancement of the degree of esterification and the rate of graft-polymerization.

As the wax or polyethylene for use in the present invention, ones having a softening point in the range of from 60° to 130° C are suitable; in the case where the softening point is less than 60° C, wax or polyethylene is hard to separate and a satisfactory dispersion cannot be obtained, while in the case where the softening point exceeds 130° C, the wax or polyethylene is hard to dissolve in a heated non-aqueous solvent.

These waxes or polyethylenes have properties closely resembling said non-aqueous solvent in respect of specific gravity.

Next, in the present invention, after completion of the step (d), the reaction mixture the is cooled, thereby making wax or polyethylene dissolved therein separate in the form of fine particles. The size of these particles in the dispersion can be varied by changing the kind and concentration of wax or polyethylene or the conditions for stirring, cooling, etc. In general, in the case where a solution with low concentration of wax or polyethylene such as a dilute solution containing 1 to 10% wax or polyethylene is quenched, there are obtained fine particles having a mean particle size of 0.1 to 0.3μ, while in the case where a concentrated solution containing, for instance, 20 to 50% wax or polyethylene is cooled gradually, there are obtained large-sized particles of about 0.5 to 20μ. Accordingly, in order to obtain fine particles, quenching is preferable.

Wax having a softening point of 60° C to 130° C or polyethylene are commercially available. Manufactures, trademarks and softening points are listed below:

| | Manufacturer | Trademark | Softening point (° C) |
|---|---|---|---|
| (1) | Polyethylene | | |
| | Union Carbide Corp. | DYNF | 102 |
| | | DYNH | 102 |
| | | DYNI | 102 |
| | | DYNJ | 102 |
| | | DYNK | 102 |
| | Du Pont Co. Inc. | Alathon-3 | 103 |
| | | Alathon-10 | 96 |
| | | Alathon-12 | 84 |
| | | Alathon-14 | 80 |
| | | Alathon-16 | 95 |
| | | Alathon-20 | 86 |
| | | Alathon-22 | 84 |
| | | Alathon-25 | 96 |
| | Monsanto Co. | Orizon-805 | 116 |
| | | Orizon-705 | 116 |
| | | Orizon-50 | 126 |
| | Philips Electronics Industrial Corp. | Marlex 1005 | 92 |
| (2) | Polyethylene wax | | |
| | Sanyo Kasei Kagaku-kogyo K.K. | Sanwax-131P | 108 |
| | | Sanwax-151P | 107 |
| | | Sanwax-161P | 111 |
| | | Sanwax-165P | 107 |
| | | Sanwax-171P | 105 |
| | | Sanwax-E200 | 95 |
| (3) | Paraffin wax | | |
| | Junsei Yakuhin K.K. | Paraffin Wax | & 60–95 |
| (4) | Beeswax | | |
| | Kobayashi Kakoh K.K. | Sarashi Beeswax | & 65 |
| | | Setanol | 80 |
| | Nagai Kakoh K.K. | Sarashi Beeswax | 65 |
| | Seitetsu Kagaku K.K. | Flohsen | 110 |

The dispersions according to the present invention are useful for coatings, especially binders for use in electrostatic coating and toners for use in electrophotography, and have such merits as follows:

1. It has a satisfactory dispersion stability and hardly coagulates. For example, even a dispersion containing 1% of solids is stable for more than 3 months.
2. It can be well absorbed to various pigments such as titanium oxide, zinc oxide, calcium carbonate, silica, etc., it displays distinct polarity in non-aqueous solvents, and it imparts a satisfactory dispersion stability to pigments because of properties thereof such as stated in (1) above.
3. As the particles thereof have a polar group to impart a fixing property, it displays a satisfactory fixability toward hydrophilic or hydrophobic surfaces of paper, plastic plate, metal plates, etc., when employed as coating material or electrophotographic toner.
4. It can be prepared by a simple manufacturing method, and the desired product can be produced in a short time at high yield.

Hereunder will be given some examples embodying the present invention.

EXAMPLE 1

300 g of Isopar G (a product of ESSO Standard Oil Co.) were put in a receptacle equipped with a stirrer, a thermometer and a reflux condenser and were heated up to a temperature of 95° C. Subsequently, after adding thereto a mixture consisting of 200 g of 2-ethyl hexyl methacrylate, 10 g of glycidyl methacrylate and 3 g of azobis-isobutyronitrile by dropping at a constant speed over a 3-hour period, additional stirring was conducted for 1 hour in order to complete the reaction. After that, 5 g of acrylic acid, 0.1 g of hydroquinone and 1 g of lauryl dimethylamine were added to the reaction mixture to react therewith at a temperature of 90° C for 15 hours, and then the resultant copolymer was esterified. The degree of esterification on this occasion was in the range of from 25 to 30% as a result of measurement of the reduction of acid value. Next, upon adding 500 g of Isopar G to the thus esterified reaction mixture and then adding a mixture consisting of 50 g of methyl methacrylate and 3 g of azobis-isobutyronitrile thereto by dropping at a constant speed over a 3-hour period at a temperature of 90° C, the reaction mixture was further maintained at said temperature for about 5 hours in order to complete the reaction. Further, after adding 300 g of Isopar G to 300 of the product from this reaction, 50 g of polyethylene (Orizon 805, a product of Monsants Chemical Co.) were added thereto while heating the mixture at a temperaure of 90° C, and the heating was continued for 1 hour until the mixture became transparent.

Next, 10 g of vinyl pyridine and 1 g of azobis-isobutyronitrile were added to a solution of the thus prepared graft-copolymer containing polyethylene and reaction was effected for 3 hours at a temperature of 90° C. When the resultant resinous solution was quenched with service water while stirring, it became a milky dispersion comprising 18.0% of solids having a mean particle size of 0.3 to 1$\mu$.

EXAMPLE 2

Except for employing maleic acid in lieu of the acrylic acid used in Example 1 for the purpose of esterification of 2-ethyl hexyl methacrylate - glycidyl methacrylate copolymer, by applying the same procedure as described in Example 1, a dispersion was prepared.

EXAMPLE 3

400 g of isooctane were put in the same reactor used in Example 1 and heated up to a temperature of 95° C. Thereafter, a mixture solution consisting of 200 g of stearyl methacrylate, 10 g of glycidyl acrylate and 2 g of benzoyl peroxide was added thereto by dropping over a 1-hour period, followed by 3 hours' stirring at a temperature of 95° C in order to complete the reaction, whereby a copolymer was prepared. Then, by adding 1 g of lauryl dimethylamine, 3 g of methacrylic acid and 0.1 g hydroquinone to the reaction mixture, an esterification reaction was effected for 10 hours at a temperature of 95° C. The degree of this esterification was 30%. Next, upon adding 600 g of isooctane to this reaction mixture, a mixture consisting of 60 g of styrene and 4 g of benzoyl peroxide was added thereto by dropping over a 3-hour period while maintaining the temperature of said reaction mixture at 95° C, and graft-polymerization reaction was further effected fo 5 hours. After adding 200 g of isooctane and then adding 50 g of paraffin wax (softening point: 70° – 72° C) at a temperature of 95° C to dissolve in the reaction product, reaction was further effected for 40 minutes at a temperature of 95° C. Subsequently, after effecting polymerization for 3 hours at a temperature of 95° C by adding 5 g of N-vinyl pyrrolidone and 1 g of benzoyl peroxide to this resinous solution, the reaction product was cooled with service water while stirring, whereby a dispersion comprising 20% of solids having a mean particle size of 0.1 to 0.2$\mu$ was obtained.

EXAMPLE 4

400 g of Isopar L were put in the same reactor as used in Example 1 and heated up to 90° C. Thereafter, a mixture solution consisting of 200 g of lauryl methacrylate, 3 g of crotonic acid and 1 g of benzoyl peroxide was added thereto by dropping over a 2-hour period, and reaction was completed by maintaining the same temperature as above for 3 hours. Subsequently, by adding 1 g of lauryl dimethylamine and 10 g of glycidyl methacrylate to the reaction mixture, esterification reaction was effected for 20 hours at a temperature of 90° C. The degree of esterification on this occasion was 50%. Next, by adding 600 g of Isopar L to this reaction mixture, heating it up to 90° C and adding 40 g of ethyl acrylate and 4 g of benzoyl peroxide thereto by dropping over a 3-hour period, reaction was further effected for 5 hours. Upon adding 200 g of Isopar L to 200 g of the product from this reaction, 20 g of polyethylene (DYNH, the manufacture of Union Carbide Co.) were added thereto at a temperature of 90° C to dissolve therein, and reaction was continuously effected for 1 hour. Subsequently, after effecting polymerization of the thus reacted solution for 4 hours at a temperature of 90° C by adding 3 g of nitrostyrene and 0.5 g of benzoyl peroxide thereto, the polymerized solution was cooled with service water while stirring, whereby a dispersion comprising 12.0% of solids having a mean particle size of 0.3 to 0.5$\mu$ was obtained.

EXAMPLE 5.

400 g of Isopar H were put in the same reactor as used in Example 1 and heated up to 85° C. Thereafter, a mixture solution consisting of 200 g of 2-ethyl hexyl methacrylate, 5g of methacrylic acid and 3 g of azobis-isobutyronitrile was added thereto by dropping over a 2-hour period, and reaction was completed by maintaining the temperature at 85° C for another 2 hours. Subsequently, by adding 1 g of lauryl dimethylamine and 5 g of glycidyl acrylate to the reaction mixture, reaction was effected for 18 hours at a temperature of 85° C. The degree of esterification on this occasion was 50%. Next, after adding 400 g of Isopar H to this reaction product and heating it up to 90° C, by adding a mixture consisting of 30 g of vinyl acetate and 3 g of azobis-isobutyronitrile thereto by dropping over a 3-hour period, reaction was further effected for 5 hours. Then, upon adding 200 g of Isopar H to 200 g of the product from this reaction, 20 g of polyethylene (Alathon-12, a product of Du Pont Co.) were added thereto at a temperature of 85° C to dissolve therein, and reaction was effected for 1 hour. Further, after effecting polymerization of the thus reacted solution for 5 hours at a temperature of 85° C by adding 6 g of diethyl aminoethyl methacrylate and 0.5 g of azobis-isobutyronitrile thereto, the polymerized solution was cooled with service water while stirring, whereby a dispersion comprising 14.0% of solids having a mean particle size of 0.6 to 0.9μ was obtained.

EXAMPLE 6

300 g of isooctane were put in the same reactor as used in Example 1 and heated up to 90° C. Thereafter, a mixture solution consisting of 200 g of 2-ethyl hexyl methacrylate, 10 g of glycidyl methacrylate and benzoyl peroxide was added thereto by dropping over a 2-hour period, and the foregoing temperature was further maintained for 4 hours in order to complete the reaction. Subsequently, by adding 1 g of lauryl dimethylamine, 3 g of maleic acid and 0.05 g of hydroquinone to the resulting copolymer solution, reaction was effected for 15 hours at a temperature of 90° C. The acid value of the reaction product on this occasion was 20. Next, after adding 520 g of isooctane to this reaction product, a mixture consisting of 40 g of vinyl toluene and 3 g of benzoyl peroxide was added thereto at a temperature of 90° C by dropping over a 3-hour period, and reaction was effected for 5 hours subsequent thereto. Then, upon adding 200 g of isooctane to 200 g of the product from this reaction and heating up to a temperature of 90° C, by adding 20 g of wax (QS Wax, the manufacture of Quaker State Oil Co.) having a boiling point of 65° C to dissolve therein, reaction was effected for one hour. When 10 g of chlorostyrene and 0.5 g of benzoyl peroxide were added to the resulting reaction mixture, polymerization reaction was effected for 3 hours at a temperature of 90° C and the reaction product was quenched, there was obtained a dispersion comprising 30% of solids having a mean particle size of 0.5μ.

EXAMPLE 7

300 g of Isopar H were put in the same apparatus as used in Example 1 and heated up to 90° C. Thereafter, a mixture solution consisting of 200 g of stearyl acrylate, 20 g of glycidyl methacrylate and 3 g of azobis-isobutyronitrile was added thereto by dropping over a 5-hour period. Subsequently, by adding 10 g of acrylic acid, 1 g of lauryl dimetylamine and 0.5 g of hydroquinone to the reaction mixture, esterification reaction was effected for 10 hours at a temperature of 90° C. Next, by adding 300 g of Isopar H and then adding a mixture consisting of 40 g of styrene monomer and 3 g of azobis-isobutyronitrile over a 3-hour period, reaction was continuously effected for 5 hours thereafter. Then, by adding 200 g of Isopar H and 40 g of polyethylene wax (SANWAX 171P, a product of SANYO KASEI K.K.) to the reaction mixture and dissolving therein at a temperature of 95° C, reaction was further effected for 1 hour. Next, this reaction mixture was polymerized for 3 hours at a temperature of 95° C. by adding 10 g of hydroxyethyl methacrylate and 0.3 g of azobis-isobutyronitrile and thereafter was quenched while stirring. As a result, a dispersion comprising 15.5% of solids having a mean particle size of 0.1 to 0.4μ was separated.

We claim:

1. A non-aqueous resin dispersion containing a graft-copolymer and at least one substance selected from the group consisting of wax or polyethylene having a softening point of 60° to 130° C, dispersed in an organic solvent having a high resistivity and a low dielectric constant, said non-aqueous resin dispersion having been prepared by carrying out successively the following four steps (a), (b), (c) and (d) in said organic solvent, at an elevated temperature, adding said wax or polyethylene in one of the four steps and dissolving it in the solvent, and cooling the reaction product of step (d) while stirring vigorously:

a. copolymerizing from 99.9 to 80 parts by weight of a monomer having the formula (I)

wherein
R is hydrogen or methyl, A is $-COOC_nH_{2n+1}$ or $-OC_nH_{2n+1}$, and $n$ is an integer of from 6 to 20, with from 0.1 to 20 parts by weight of at least one co-monomer selected from the group consisting of an unsaturated carboxylic acid, glycidyl acrylate and glycidyl methacrylate;

b. esterifying 100 parts by weight of the copolymer obtained in step (a) with from 0.1 to 20 parts by weight of glycidyl acrylate or glycidyl acrylate when said copolymer has been prepared by using an unsaturated carboxylic acid, or esterifying 100 parts by weight of the copolymer obtained in step (a) with from 0.1 to 20 parts by weight of said unsaturated carboxylic acid when said copolymer has been prepared by using glycidyl acrylate or glycidyl methacrylate;

c. grafting 100 parts by weight of the esterified copolymer obtained in step (b) with from 5 to 100 parts by weight of a monomer having a vinyl group;

d. polymerizing 100 parts by weight of the graft copolymer obtained in step (c) with from 0.1 to 20 parts by weight of a compound selected from the group consisting of maleic acid, furmaric acid, allylamine, vinylamine, aroyl alcohol, vinylsulfonic acid, vinyl phosphate and a vinyl monomer having the formula

wherein R is hydrogen or methyl, and B is

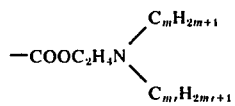

wherein $m$ and $m'$ are integers from 1 to 4,

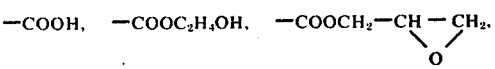

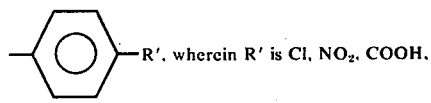

-continued

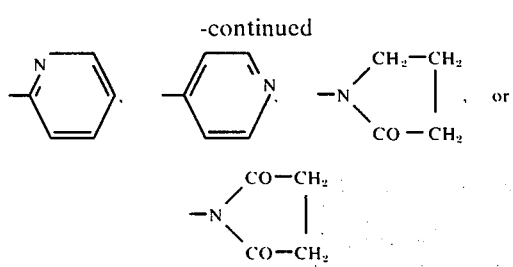

and wherein the amount of said wax or polyethylene added is as follows:
when added in step (a), from 5 to 50 parts by weight of said wax or polyethylene, per 100 parts by weight of the sum of the weights of said monomer (I) and said co-monomer, when added in step (b), from 5 to 50 parts by weight of said wax or polyethylene, per 100 parts by weight of the copolymer obtained in step (a),
when added in step (c), from 1 to 40 parts by weight of said wax or polyethylene, per 100 parts by weight of the esterified copolymer obtained in step (b), and
when added in step (d), from 5 to 50 parts by weight of said wax or polyethylene, per 100 parts by weight of the graft copolymer obtained in step (c).

2. A non-aqueous resin dispersion as claimed in claim 1, in which said unsaturated carboxylic acid is selected from the group consisting of acrylic acid, methacrylic acid, fumaric acid, crotonic acid, itaconic acid and maleic acid.

3. A non-aqueous resin dispersion as claimed in claim 2, in which said monomer having a vinyl group employed in step (c) is selected from the group consisting of acrylic acid, methacrylic acid, lower alkyl ($C_1$ to $C_4$) esters of acrylic acid or methacrylic acid, styrene, methylstyrene and vinyl acetate.

4. A non-aqueous resin dispersion as claimed in claim 3, in which said wax or polyethylene is added in step (c).

5. A non-aqueous resin dispersion as claimed in claim 3 in which said monomer having the formula (I) is selected from the group consisting of lauryl, 2-ethylhexyl, stearyl or vinylstearyl acrylates and methacrylates.

6. A non-aqueous resin dispersion as claimed in claim 1, in which said organic solvent is an aliphatic hydrocarbon or a halogenated aliphatic hydrocarbon.

7. A process for preparing a non-aqueous resin dispersion containing a graft-copolymer which comprises carrying out successively the following four steps (a), (b), (c) and (d) in an organic solvent, at an elevated temperature, adding wax or polyethylene having a softening point of 60° to 130° C in one of the four steps and dissolving it in the solvent, and cooling the reaction product of step (d) while stirring vigorously:

a. copolymerizing from 99.9 to 80 parts by weight of a monomer having the formula (I)

wherein
R is hydrogen or methyl, A is $-COOC_nH_{2n+1}$ or $-OC_nH_{2n+1}$, and n is an integer of from 6 to 20, with from 0.1 to 20 parts by weight of at least one co-monomer selected from the group consisting of an unsaturated carboxylic acid, glycidyl acrylate and glycidyl methacrylate;

b. esterifying 100 parts by weight of the copolymer obtained in step (a) with from 0.1 to 20 parts by weight of glycidyl acrylate or glycidyl acrylate when said copolymer has been prepared by using an unsaturated carboxylic acid, or esterifying 100 parts by weight of the copolymer obtained in step (a) with from 0.1 to 20 parts by weight of said unsaturated carboxylic acid when said copolymer has been prepared by using glycidyl acrylate or glycidyl methacrylate; c. grafting 100 parts by weight of the esterified copolymer obtained in step (b) with from 5 to 100 parts by weight of a monomer having a vinyl group;

d. polymerizing 100 parts by weight of the graft copolymer obtained in step (c) with from 0.1 to 20 parts by weight of a compound selected from the group consisting of maleic acid, fumaric acid, allylamine, vinylamine, aroyl alcohol, vinyl sulfonic acid, vinyl phosphate and a vinyl monomer having the formula

wherein
R is hydrogen or methyl, and
B is

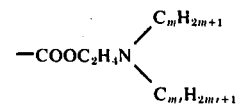

wherein m and m' are integers from 1 to 4,

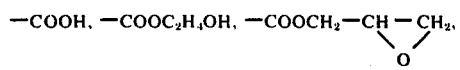

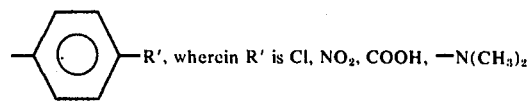

OH or $NH_2$,

-continued

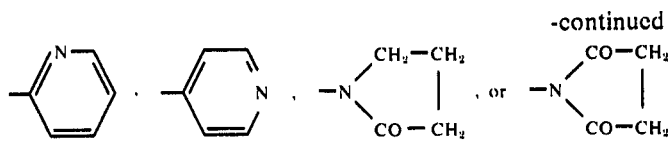

and wherein the amount of said wax or polyethylene added is as follows:
  when added in step (a), from 5 to 50 parts by weight of said wax or polyethylene, per 100 parts by weight of the sum of the weights of said monomer (I) and said co-monomer, when added in step (b), from 5 to 50 parts by weight of said wax or polyethylene, per 100 parts by weight of the copolymer obtained in step (a),
  when added in step (c), from 1 to 40 parts by weight of said wax or polyethylene, per 100 parts by weight of the esterified copolymer obtained in step (b), and
  when added in step (d), from 5 to 50 parts by weight of said wax or polyethylene, per 100 parts by weight of the graft copolymer obtained in step (c).

8. A process as claimed in claim 7, in which said unsaturated carboxylic acid is selected from the group consisting of acrylic acid, methacrylic acid, fumaric acid, crotonic acid, itaconic acid and maleic acid.

9. A process as claimed in claim 8, in which said monomer having a vinyl group employed in step (c) is selected from the group consisting of acrylic acid, methacrylic acid, lower alkyl ($C_1$ to $C_4$) esters of acrylic acid or methacrylic acid, styrene, methylstyrene and vinyl acetate.

10. A process as claimed in claim 9, in which said wax or polyethylene is added in step (c).

11. A process as claimed in claim 9, in which said monomer having the formula (I) is selected from the group consisting of lauryl, 2-ethylhexyl, stearyl or vinylstearyl acrylates and methacrylates.

12. A process as claimed in claim 7, in which said organic solvent is an aliphatic hydrocarbon or a halogenated aliphatic hydrocarbon.

* * * * *